(12) United States Patent
Chatterjee et al.

(10) Patent No.: US 10,819,470 B2
(45) Date of Patent: Oct. 27, 2020

(54) BEHAVIOR OF USER EQUIPMENT (UE) IN SCENARIOS OF CONFLICTING RESOURCE ASSIGNMENTS IN NEW RADIO (NR) SYSTEMS

(71) Applicant: Intel IP Corporation, Santa Clara, CA (US)

(72) Inventors: Debdeep Chatterjee, San Jose, CA (US); Gang Xiong, Beaverton, OR (US); Sergey Panteleev, Nizhny Novgorod (RU)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/245,047

(22) Filed: Jan. 10, 2019

(65) Prior Publication Data

US 2019/0149269 A1    May 16, 2019

Related U.S. Application Data

(60) Provisional application No. 62/617,105, filed on Jan. 12, 2018.

(51) Int. Cl.
| | |
|---|---|
| *H04L 1/06* | (2006.01) |
| *H04W 74/08* | (2009.01) |
| *H04L 5/14* | (2006.01) |
| *H04L 5/00* | (2006.01) |
| *H04L 25/02* | (2006.01) |
| *H04W 72/12* | (2009.01) |

(52) U.S. Cl.
CPC .......... *H04L 1/0693* (2013.01); *H04L 5/0083* (2013.01); *H04L 5/14* (2013.01); *H04L 25/0226* (2013.01); *H04W 72/1268* (2013.01); *H04W 74/085* (2013.01); *H04W 74/0858* (2013.01)

(58) Field of Classification Search
CPC ....... H04L 1/0693; H04L 5/14; H04L 5/0083; H04L 25/0226; H04W 72/1268; H04W 74/085; H04W 74/0858
See application file for complete search history.

(56) References Cited

U.S. PATENT DOCUMENTS

| | | | | |
|---|---|---|---|---|
| 2014/0293843 | A1* | 10/2014 | Papasakellariou .. | H04W 72/042 370/280 |
| 2017/0086170 | A1* | 3/2017 | Takeda ................. | H04L 5/1415 |
| 2019/0149269 | A1* | 5/2019 | Chatterjee ......... | H04W 74/0858 370/329 |
| 2019/0349180 | A1* | 11/2019 | Lu ........................ | H04L 5/0094 |

* cited by examiner

*Primary Examiner* — Benjamin H Elliott, IV
(74) *Attorney, Agent, or Firm* — Schwegman Lundberg & Woessner, P.A.

(57) ABSTRACT

Embodiments of a User Equipment (UE) and methods of communication are generally described herein. If the UE is configured by higher layers to transmit, in a set of symbols of a slot, a sounding reference signal (SRS), a physical uplink control channel (PUCCH), a physical uplink shared channel (PUSCH), or a physical random access channel (PRACH); and if a downlink control information (DCI) format indicates that the UE is to receive, in a subset of the set of symbols of the slot, channel state information reference signals (CSI-RS) or a physical downlink shared channel (PDSCH): the UE may: cancel transmission of the PUCCH, the PUSCH, or the PRACH in remaining symbols from the set of symbols; and may cancel transmission of the SRS in remaining symbols from the subset of symbols.

11 Claims, 10 Drawing Sheets

BEHAVIOR OF USER EQUIPMENT (UE) IN SCENARIOS OF CONFLICTING RESOURCE ASSIGNMENTS IN NEW RADIO (NR) SYSTEMS

PRIORITY CLAIM

This application claims priority under 35 USC 119(e) to United States Provisional Patent Application Ser. No. 62/617,105, filed Jan. 12, 2018, which is incorporated herein by reference in its entirety.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to behavior of User Equipment (UE), including behavior of the UE in scenarios of conflicting resource assignments.

BACKGROUND

Base stations and mobile devices operating in a cellular network may exchange data. As demand for mobile services and high data rates increases, various challenges related to reliability and capacity may arise. In an example scenario, a large number of users may demand access to the network. In another example scenario, performance requirements may be more demanding for new systems and/or new applications in comparison to legacy systems and/or legacy applications. Various operations, such as exchanging of data, control information and/or performance information between the base stations and mobile devices, may become challenging in these and other scenarios. Accordingly, there is a general need for methods to enable communication in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
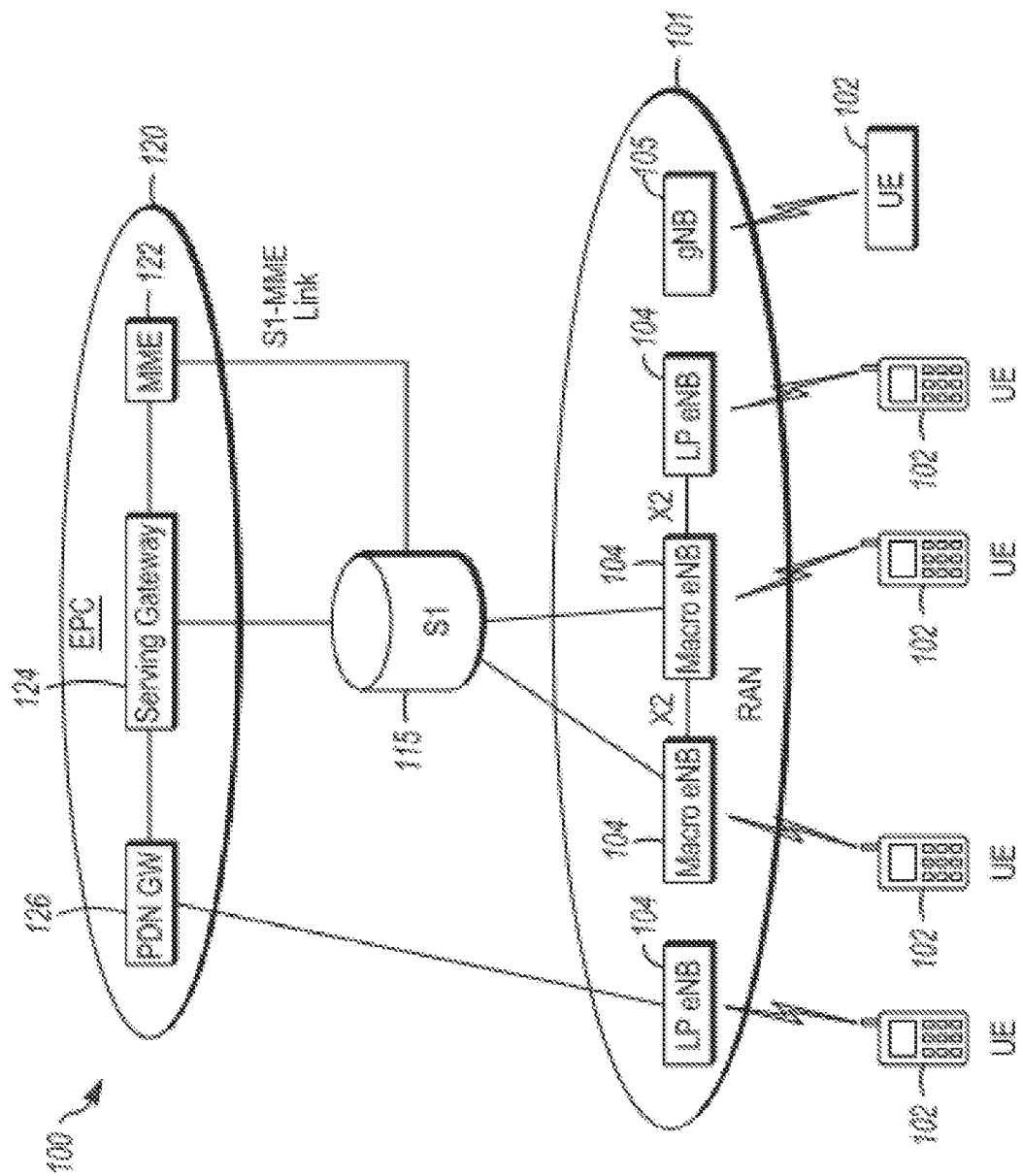
FIG. 1A is a functional diagram of an example network in accordance with some embodiments.
Figure 1B:
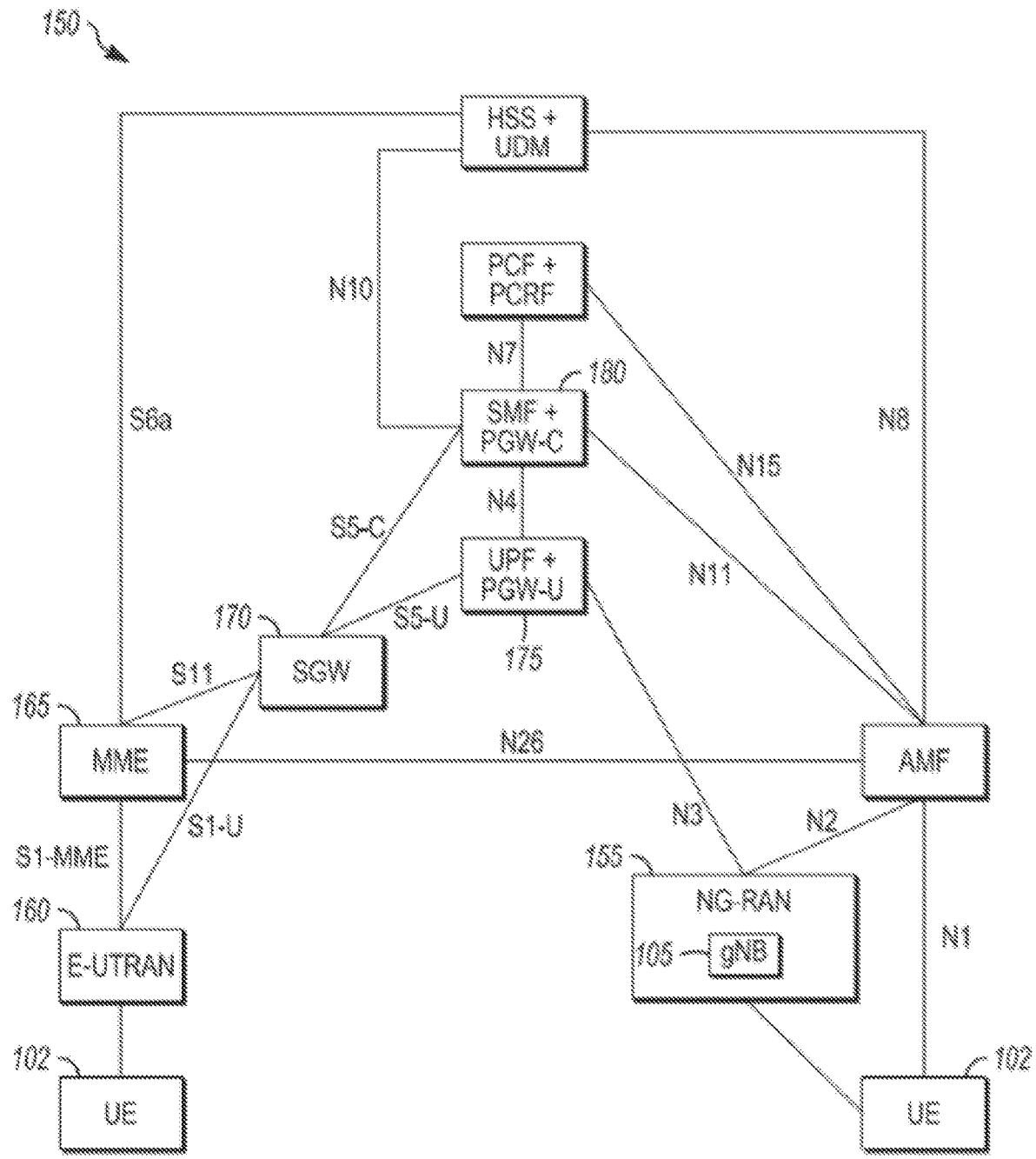
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
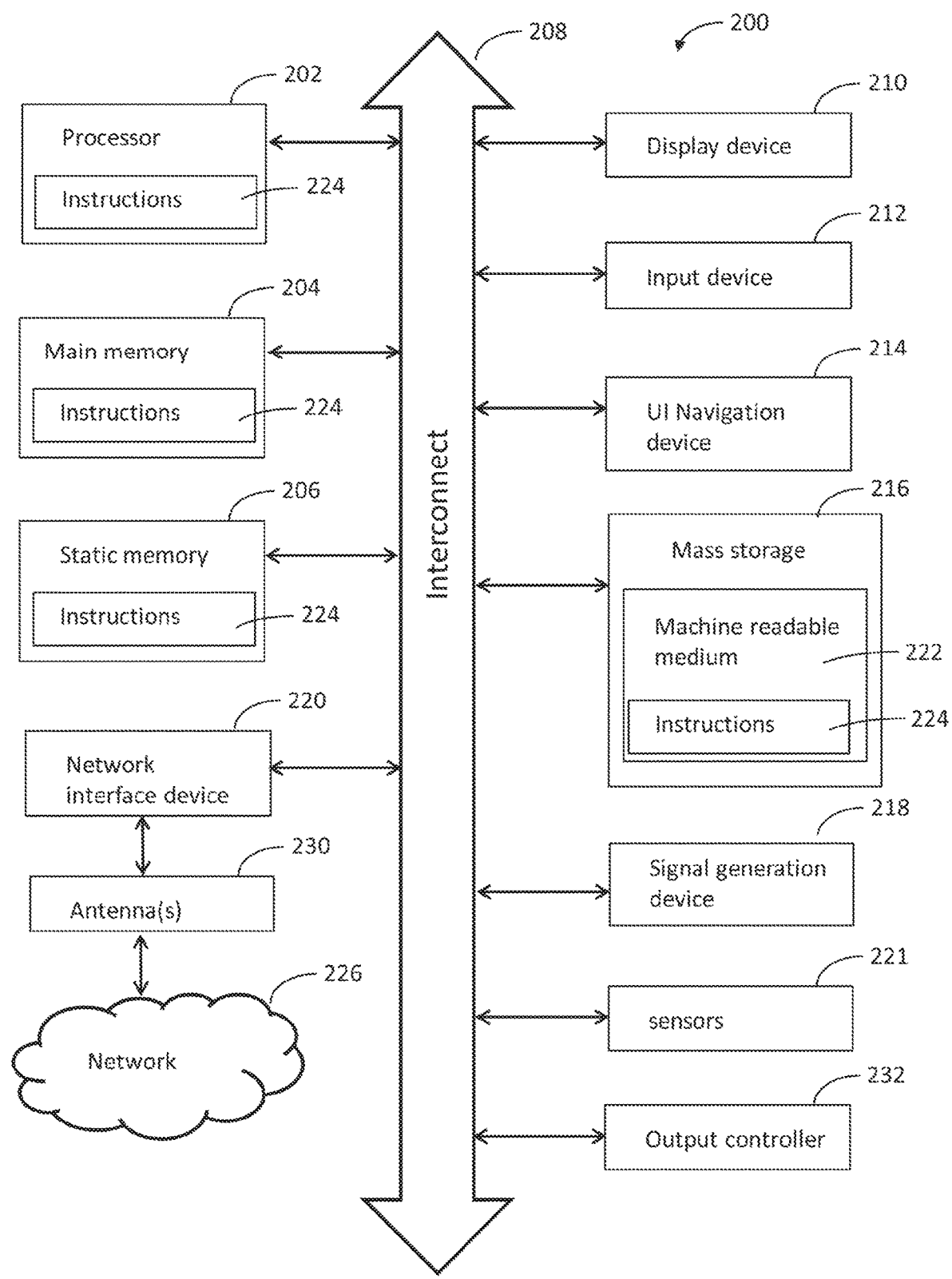
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
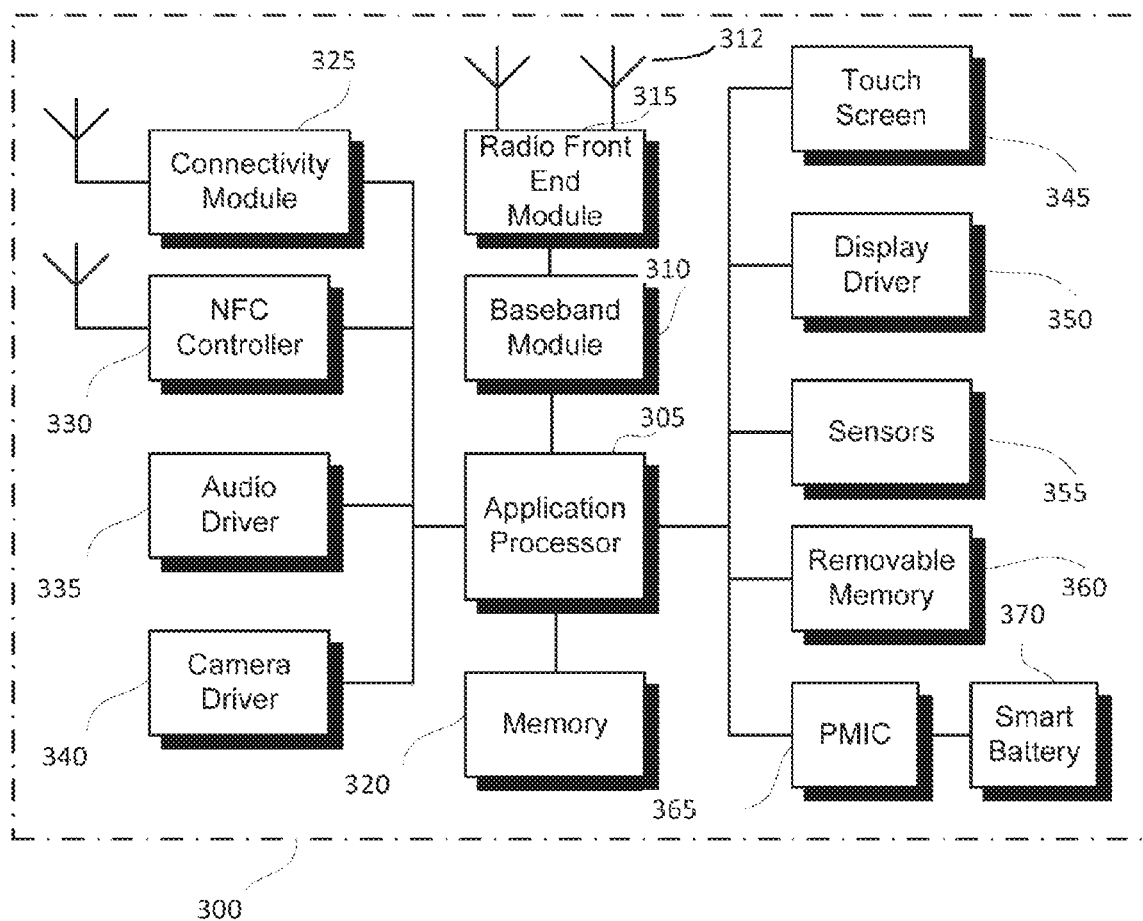
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
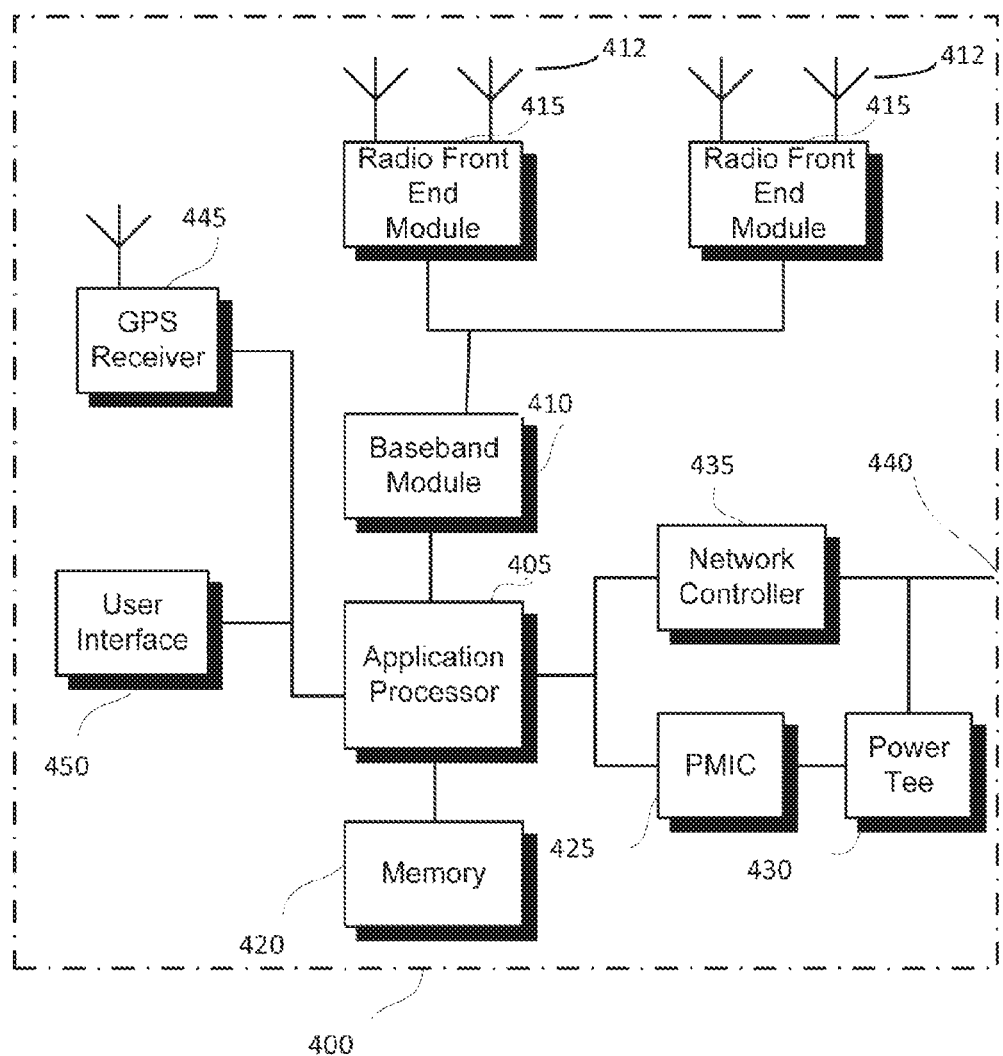
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
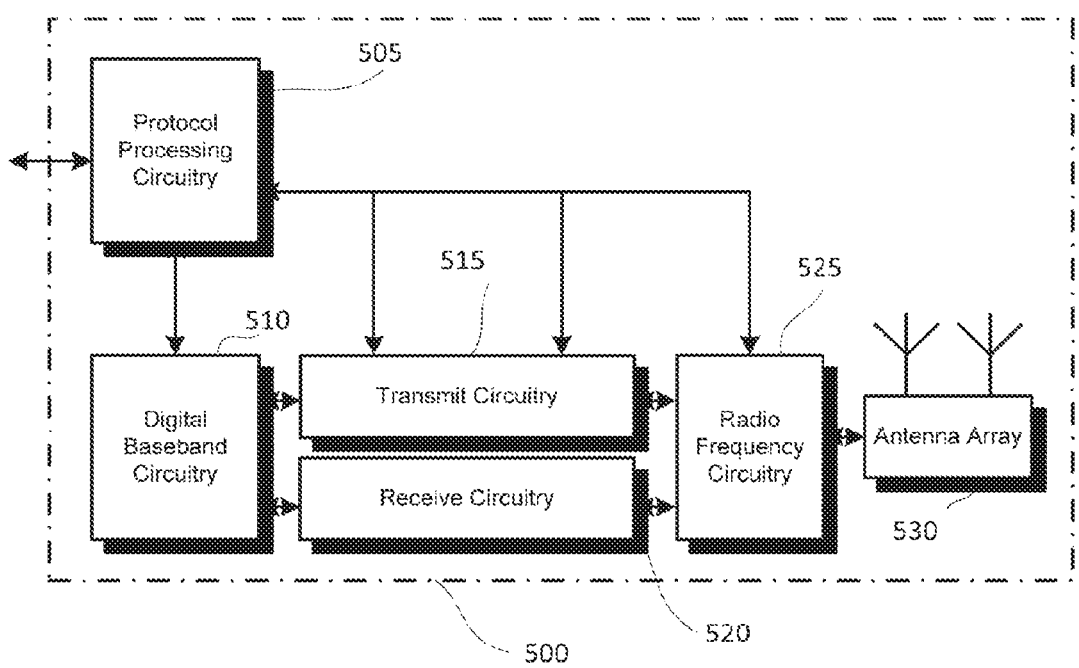
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
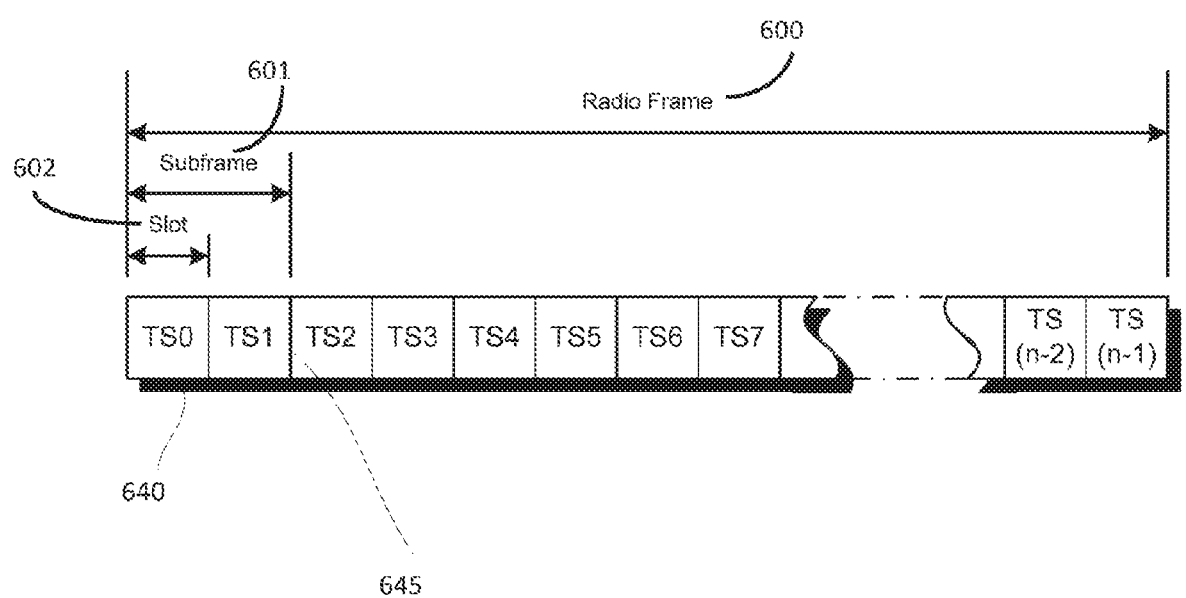
FIG. 6 illustrates an example of a radio frame structure in accordance with some embodiments.
Figures 7A, 7B:
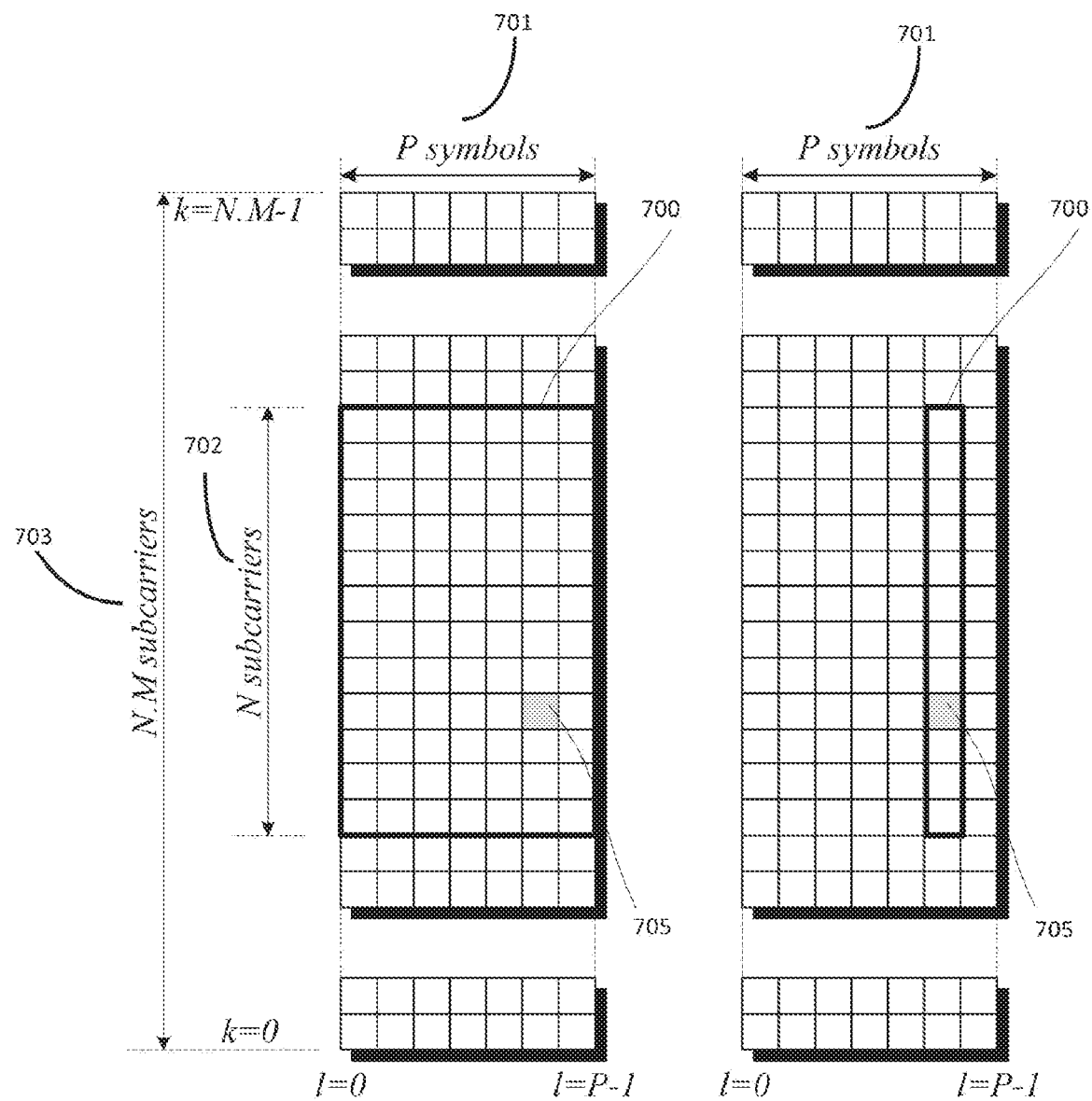
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a subcomponent of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N·M−1 (as indicated by 703), where N is the number of subcarriers in a resource block, and M is the number of resource blocks spanning a component carrier in the frequency domain.

In accordance with some embodiments, an apparatus of a UE 102 may comprise memory. The apparatus may further comprise processing circuitry. If the UE 102 is configured by higher layers to transmit, in a set of symbols of a slot, a sounding reference signal (SRS), a physical uplink control channel (PUCCH), a physical uplink shared channel (PUSCH), or a physical random access channel (PRACH); and if a downlink control information (DCI) format comprising one of DCI format 1_0, DCI format 1_1, and DCI format 0_1, is detected; and if the DCI format indicates that the UE 102 is to receive, in a subset of the set of symbols of the slot, channel state information reference signals (CSI-RS) or a physical downlink shared channel (PDSCH): the processing circuitry may be configured to cancel transmission of the PUCCH, the PUSCH, or the PRACH in remaining symbols from the set of symbols; and the processing circuitry may be further configured to cancel transmission of the SRS in remaining symbols from the subset of symbols. These embodiments are described in more detail below.

Figure 8:
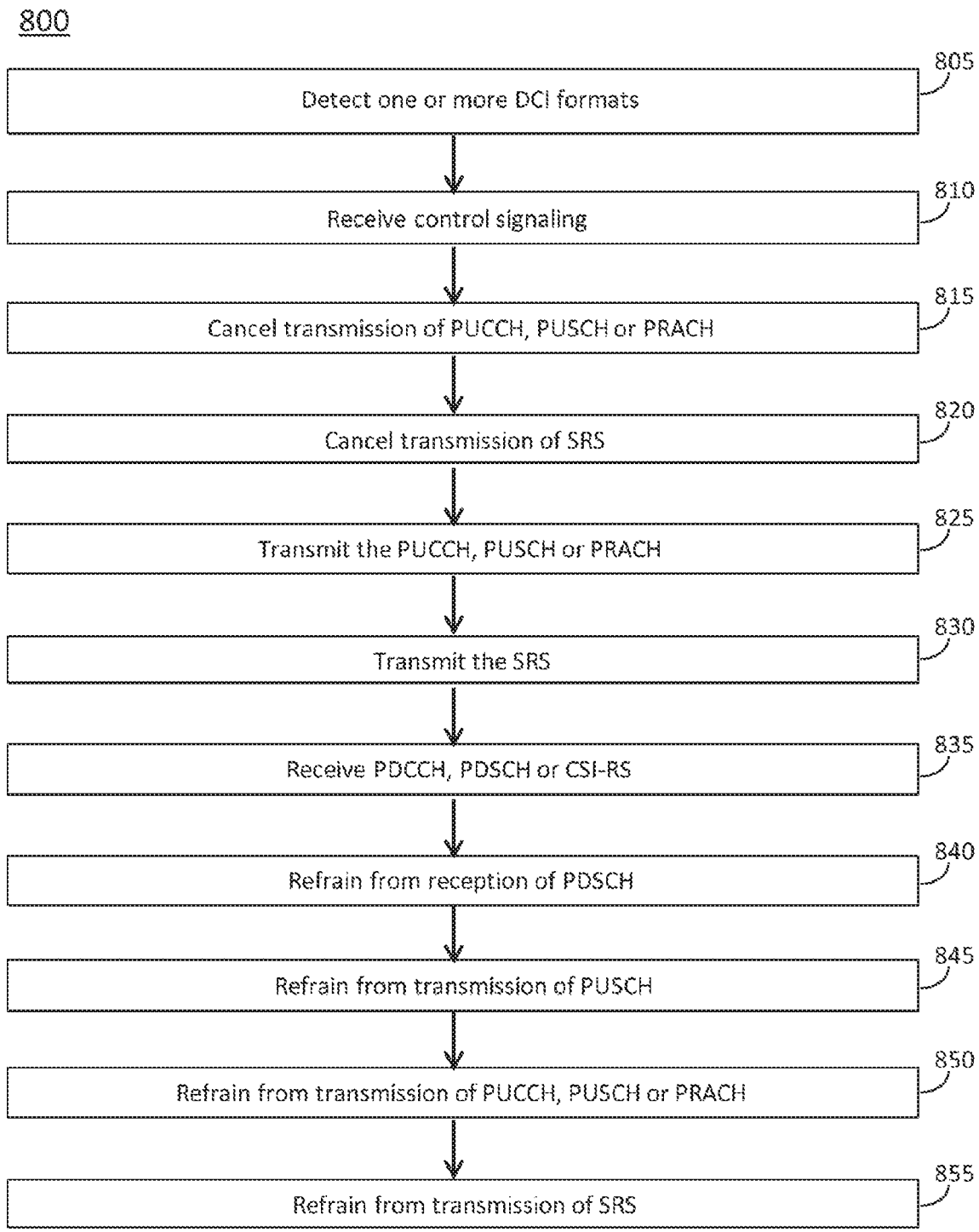
FIG. 8 illustrates the operation of a method of communication in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In describing the method 800, reference may be made to one or more figures, although it is understood that the method 800 may be practiced with any other suitable systems, interfaces and components.

In some embodiments, a UE 102 may perform one or more operations of the method 800, but embodiments are not limited to performance of the method 800 and/or operations of it by the UE 102. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the gNB 105 may perform an operation that may be the same as, similar to, reciprocal to and/or related to an operation of the method 800, in some embodiments.

It should be noted that one or more operations of a method may be the same as, similar to and/or reciprocal to one or more operations of the method 800. For instance, an operation of a method performed by the gNB 105 may be the same as, similar to and/or reciprocal to an operation of the method 800, in some embodiments. In a non-limiting example, an operation of the method 800 may include reception of an element (such as a frame, block, message and/or other) by the UE 102, and an operation of a method performed by the gNB 105 may include transmission of a same element (and/or similar element) by the gNB 105.

Discussion of various techniques and concepts regarding the method 800 may be applicable to another method (such as a method performed by a gNB 105 or other component), although the scope of embodiments is not limited in this respect. Such techniques and concepts may include DCI, PUSCH, PUCCH, PRACH, SRS, PDSCH, PDCCH, CSI-RS, transmission and/or reception of such elements and/or other techniques/concepts.

The method 800 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the method 800 and other methods described herein may be practiced by wireless devices configured to operate in other suitable types of wireless communication systems, including systems configured to operate according to various IEEE standards such as IEEE 802.11. The method 800 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the method 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of elements that are included in standards, however.

In some embodiments, the UE 102 may be arranged to operate in accordance with a new radio (NR) protocol. In some embodiments, the gNB 105 may be arranged to operate in accordance with an NR protocol.

At operation 805, the UE 102 may detect one or more downlink control information (DCI) formats. In some embodiments, the UE 102 may detect multiple DCI formats at different times. For instance, the UE 102 may detect a DCI format, may perform one or more operations (including or more operations of the method 800), and then may detect another DCI format. In some embodiments, the DCI formats may be different, such as DCI format 0_0 and DCI format 0_1. In some embodiments, the UE 102 may detect and/or receive the one or more DCI formats from the gNB 105, although the scope of embodiments is not limited in this respect.

At operation 810, the UE 102 may receive control signaling. In some embodiments, the UE 102 may receive the control signaling from the gNB 105, although the scope of embodiments is not limited in this respect.

At operation 815, the UE 102 may cancel transmission of a physical uplink control channel (PUCCH), a physical uplink shared channel (PUSCH) or a physical random access channel (PRACH). At operation 820, the UE 102 may cancel transmission of a sounding reference signal (SRS).

In some embodiments, if the UE 102 is configured (by higher layers or otherwise) to transmit, in a set of symbols of a slot: an SRS, a PUCCH, a PUSCH or a PRACH; and if a DCI format comprising one of DCI format 1_0, DCI format 1_1, and DCI format 0_1, is detected; and if the DCI format indicates that the UE 102 is to receive, in a subset of the set of symbols of the slot, channel state information reference signals (CSI-RS) or a physical downlink shared channel (PDSCH): the UE 102 may cancel transmission of the PUCCH, the PUSCH, or the PRACH in remaining symbols from the set of symbols; and the UE 102 may cancel transmission of the SRS in remaining symbols from the subset of symbols. Embodiments are not limited to performance of both actions (cancellation of transmission of the PUCCH, the PUSCH or the PRACH and cancellation of transmission of the SRS), as the UE 102 may perform one or more of those actions, in some embodiments.

In some embodiments, if the UE 102 is configured (by higher layers or otherwise) to transmit, in a set of symbols of a slot, an SRS, a PUCCH, a PUSCH or a PRACH, and the UE 102 detects a DCI format 2_0 with a slot format value other than 255 that indicates a slot format with a subset of symbols from the set of symbols as downlink or flexible: the UE 102 may cancel transmission of the PUCCH, the PUSCH, or the PRACH in remaining symbols from the set of symbols; and the UE 102 may cancel transmission of the SRS in remaining symbols from the subset of symbols. Embodiments are not limited to performance of both actions (cancellation of transmission of the PUCCH, the PUSCH or the PRACH and cancellation of transmission of the SRS), as the UE 102 may perform one or more of those actions, in some embodiments.

In some embodiments, the UE 102 may cancel transmission of the PUCCH, the PUSCH, or the PRACH in the remaining symbols from the set of symbols if: the UE 102 is configured to transmit the PUCCH, the PUSCH or the PRACH in the set of symbols, and the DCI format indicates that the UE 102 is to receive, in the subset of the symbols of the slot, the CSI-RS or the PDSCH. Accordingly, the UE 102 may cancel the transmission of the PUCCH, the PUSCH, or the PRACH, as described above, if the UE 102 is configured to transmit the PUCCH, the PUSCH, or the PRACH. However, if the UE 102 is not configured to transmit the PUCCH, the PUSCH, or the PRACH, the UE 102 may not necessarily cancel transmission of the PUCCH, the PUSCH, or the PRACH.

In some embodiments, the UE 102 may cancel the transmission of the SRS in the remaining symbols from the subset of symbols if: the UE 102 is configured to transmit the SRS in the set of symbols, and the DCI format indicates that the UE 102 is to receive, in the subset of the symbols of the slot, the CSI-RS or the PDSCH. Accordingly, the UE 102 may cancel the transmission of the SRS, as described above, if the UE 102 is configured to transmit the SRS. However, if the UE 102 is not configured to transmit the SRS, the UE 102 may not necessarily cancel transmission of the SRS.

In some embodiments, a combination of two or more of the techniques described above (in which cancellation of transmission of the PUCCH, the PUSCH or the PRACH and/or cancellation of transmission of the SRS may be performed) may be used. For instance, the UE 102 may cancel transmission of the PUCCH, the PUSCH or the PRACH and/or cancel transmission of the SRS based on: conditions described herein related to the detection, by the UE 102, of the DCI format 1_0, DCI format 1_1, and/or DCI format 0_1; conditions described herein related to the detection, by the UE 102, of the DCI format 2_0; and/or other factor(s).

In some embodiments, the UE 102 may determine whether there is a conflict between: assignment of a set of symbols for downlink reception indicated by a DCI format, and assignment of the set of symbols for uplink transmission as configured by the higher layers (including but not limited to RRC signaling). The UE 102 may, if it is determined that there is a conflict, refrain from uplink transmission in at least a portion of the set of symbols.

In some embodiments, a slot format may be configurable to include uplink symbols, downlink symbols, and flexible symbols.

At operation 825, the UE 102 may transmit the PUCCH, PUSCH or PRACH. At operation 830, the UE 102 may transmit the SRS. In some embodiments, if the DCI format does not indicate that the UE 102 is to receive the CSI-RS or the PDSCH in the symbols of the slot, or if the UE 102 does not detect the DCI format, the UE 102 may perform one or more of the following. If the UE 102 is configured to transmit the PUCCH, the PUSCH or the PRACH in the set of symbols of the slot, and if the transmission of the PUCCH, the PUSCH or the PRACH overlaps the remaining symbols from the set of symbols, the UE 102 may transmit and/or continue transmission of the PUCCH, the PUSCH, or the PRACH in the remaining symbols from the set of symbols. If the UE 102 is configured to transmit the SRS in the set of symbols of the slot, and if the transmission of the SRS overlaps the remaining symbols from the subset of symbols, the UE 102 may transmit and/or continue transmission of the SRS in the remaining symbols from the subset of symbols.

At operation 835, the UE 102 may receive a physical downlink control channel (PDCCH), a physical downlink shared channel (PDSCH) or channel state information reference signal (CSI-RS). In some embodiments, if the UE 102 is configured to receive a PDCCH or a PDSCH, or a CSI-RS in a set of symbols, the UE may decode and/or receive the PDCCH, the PDSCH or the CSI-RS if the UE 102 does not detect and/or receive a DCI format 0_0, DCI format 0_1, DCI format 1_0, DCI format 1_1, or DCI format 2_3 that indicates to the UE 102 to transmit a PUSCH, a PUCCH, a PRACH, or a SRS in at least one symbol of the set of symbols of the slot.

At operation 840, the UE 102 may refrain from reception of a PDSCH. In some embodiments, if the UE 102 is scheduled by a DCI format 1_1 to receive a PDSCH over a plurality of slots; and if a TDD-UL-DL-ConfigurationCommon information element (IE) or a TDD-UL-DL-ConfigDedicated IE indicates that, for a slot from the plurality of slots, from a set of symbols in which the UE 102 is scheduled to receive the PDSCH in the slot, at least one symbol of the set of symbols is an uplink symbol: the UE 102 may refrain from reception of the PDSCH in the slot. In some embodiments, if the UE 102 is scheduled by a DCI format 1_1 or a DCI format 1_0 to receive a PDSCH over a plurality of slots; and if a TDD-UL-DL-Configuration-Common information element (IE) or a TDD-UL-DL-ConfigDedicated IE indicates that, for a slot from the plurality of slots, from a set of symbols in which the UE 102 is scheduled to receive the PDSCH in the slot, at least one symbol of the set of symbols is an uplink symbol: the UE 102 may refrain from reception of the PDSCH in the slot.

In some embodiments, the UE 102 may determine whether there is a conflict between: assignment of a plurality of symbols for downlink reception of a PDSCH indicated by a DCI, and assignment of the plurality of symbols for uplink transmission. The UE 102 may, if it is determined that there is a conflict, refrain from downlink reception in at least a portion of the plurality of symbols.

At operation 845, the UE 102 may refrain from transmission of a physical uplink shared channel (PUSCH). In some embodiments, if the UE 102 is scheduled by a DCI format 0_1 to transmit a PUSCH over a plurality of slots; and if a TDD-UL-DL-ConfigurationCommon IE or TDD-UL-DL-ConfigDedicated IE indicates that, for a slot from the second plurality of slots, from a second set of symbols in which the UE 102 is scheduled to transmit the PUSCH in the slot, at least one symbol of the second set of symbols is a downlink symbol: the UE 102 may refrain from transmission of the PUSCH in the slot. In some embodiments, if the UE 102 is scheduled by a DCI format 0_1 or a DCI format 0_0 to transmit a PUSCH over a plurality of slots; and if a TDD-UL-DL-ConfigurationCommon IE or TDD-UL-DL-ConfigDedicated IE indicates that, for a slot from the second plurality of slots, from a second set of symbols in which the UE 102 is scheduled to transmit the PUSCH in the slot, at least one symbol of the second set of symbols is a downlink symbol: the UE 102 may refrain from transmission of the PUSCH in the slot.

In some embodiments, the UE 102 may receive a system information block type-1 (SIB1) that includes the TDD-UL-DL-ConfigurationCommon IE or the TDD-UL-DL-ConfigDedicated IE.

At operation 850, the UE 102 may refrain from transmission of a PUCCH, PUSCH or PRACH. At operation 855, the UE 102 may refrain from transmission of an SRS.

In some embodiments, for a set of symbols of a slot that are indicated to the UE 102, by an ssb-PositionsInBurst element included in a System Information Block Type 1 (SIB1) or in a ServingCellConfigCommon information element (IE), for reception of synchronization signal/physical broadcast channel (SS/PBCH) blocks, if a transmission of a PUSCH, PUCCH or a PRACH in the slot would overlap with at least one symbol from the set of symbols: the UE 102 may refrain from transmission of the PUSCH, PUCCH or PRACH in the slot; and the UE 102 may refrain from transmission of an SRS in the set of symbols.

In some embodiments, the UE 102 may receive a higher-layer configuration using Radio Resource Control (RRC) signaling or a DCI format that configures the UE 102 to transmit the SRS, the PUCCH, the PUSCH or the PRACH in the slot. The DCI format may be one of: DCI format 0_0, DCI format 0_1, DCI format 1_0, DCI format 1_1, and DCI format 2_3.

In some embodiments, the UE 102 may determine whether there is a conflict between: assignment of the set of symbols for downlink reception of the SS/PBCH indicated by the SIB1 or ServingCellConfigCommon IE (and/or other element/signaling), and assignment of the set of symbols for uplink transmission PUSCH, PUCCH or PRACH. If it is determined that there is a conflict, the UE 102 may refrain from uplink transmission in at least a portion of the set of symbols.

In some embodiments, the UE 102 may, for flexible symbols configured by a semi-static downlink/uplink (DL/UL) configuration, perform a transmit/receive (Tx/Rx) measurement if: a dynamic scheduling downlink control information (DCI) over-writes a dynamic slot format indicator (SFI), and the dynamic scheduling DCI indicates a second direction that is the same as a first direction for the Tx/Rx measurement. The first direction may be an uplink direction or a downlink direction. The second direction may be the uplink direction or the downlink direction.

In some embodiments, the UE 102 may, for a dynamically triggered multi-slot/mini-slot transmission/reception (Tx/Rx), when a number of available downlink (DL) or uplink (UL) symbols in each slot or mini-slot is less than a duration indicated by a downlink control information (DCI) of a DL grant or a UL grant: postpone transmission of one or more uplink elements; and/or postpone reception of one or more downlink elements.

In some embodiments, the UE 102 may, for semi-statically or semi-persistently configured or dynamically triggered multi-slot/mini-slot transmission/reception (Tx/Rx), when inter-slot/mini-slot frequency hopping is enabled, when the UE 102 drops or cancels transmission of one or more uplink elements or cancels reception of one or more downlink elements of a slot: determine a frequency hopping boundary based at least partly on the slot.

In some embodiments, the UE 102 may, for frequency hopping on a per-slot basis, if the UE 102 drops or cancels transmission of one or more uplink elements or cancels reception of one or more downlink elements in a slot: determine a frequency hopping pattern based on another frequency pattern that would occur without the UE 102 dropping or canceling of the transmission or reception in the slot.

In some embodiments, an apparatus of a UE 102 may comprise memory. The memory may be configurable to store at least a portion of a DCI format. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decoding of the DCI format. The apparatus may include a transceiver to receive the DCI format. The transceiver may transmit and/or receive other blocks, messages and/or other elements.

Figure 9:
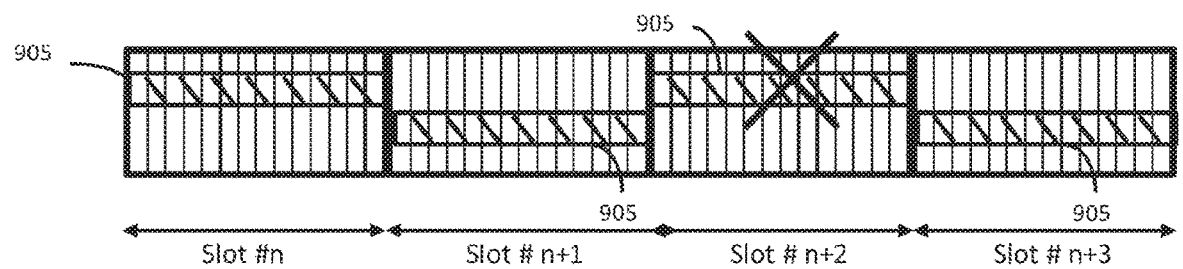
FIG. 9 illustrates examples of frequency hopping in accordance with some embodiments.
Figure 9:
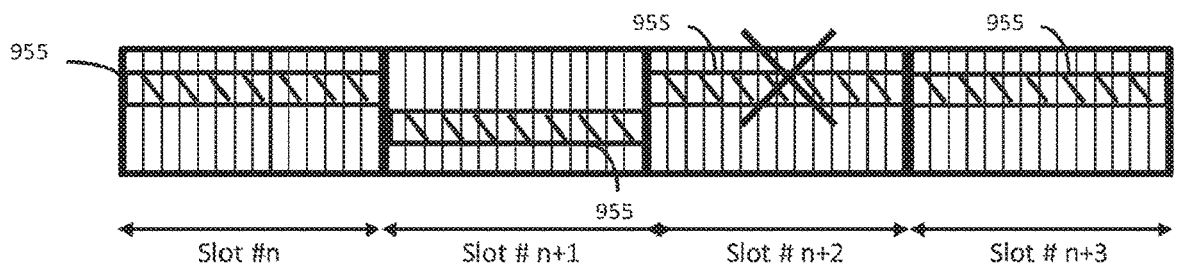

FIG. 9 illustrates examples of frequency hopping in accordance with some embodiments. It should be noted that the examples shown in FIG. 9 may illustrate some or all of the concepts and techniques described herein in some cases, but embodiments are not limited by the examples. For instance, embodiments are not limited by the name, number, type, size, ordering, arrangement of elements (such as slots, frequencies, frequency hops, frequencies of a frequency hopping pattern and/or other elements) shown in FIG. 9. Although some of the elements shown in the examples of FIG. 9 may be included in a 3GPP LTE standard, 5G standard, NR standard and/or other standard, embodiments are not limited to usage of such elements that are included in standards.

In some cases, next generation wireless communication systems/protocols may be used, such as 5G, new radio (NR) and/or other. In some cases, such systems/protocols may be used in a unified network/system that may target vastly different and sometime conflicting performance dimensions and services. Such diverse multi-dimensional requirements may be driven by different services and applications. In general, NR may evolve based on 3GPP LTE-Advanced with additional potential new Radio Access Technologies (RATs), although the scope of embodiments is not limited in this respect.

In some embodiments, for NR, a slot format may include downlink symbols, uplink symbols, and flexible symbols. Furthermore, group common physical downlink control channel (PDCCH) may carry dynamic slot format indication (SFI), from which the UE 102 may derive information, including but not limited to which symbols in a slot are DL, UL, or flexible.

In some embodiments, behavior of a UE 102 when the UE 102 receives conflicting information from cell specific and UE specific semi-static downlink and uplink (DL/UL) configuration and dynamic DL/UL configuration may be defined. In some embodiments, one or more of the following may be used: semi-static DL/UL direction is not overwritten by dynamic SFI; flexible symbols in semi-static DL/UL assignment can be overwritten by measurement, dynamic SFI, and UE specific data; semi-static measurement related reception and transmission can be overwritten by DCI and dynamic SFI (in which cases, UE behavior may include cancellation of measurement or measurement related transmission); and/or other.

In some embodiments, UE behavior for transmission/reception of physical channels and signals in case of time-domain conflicts with determined link directions may be defined. Such behavior may include one or more of: UE behavior on handling conflict between periodic transmission and DL/UL transmission from semi-static assignment; UE behavior on handling of semi-statically/persistently configured Rx/Tx in a symbol in which dynamic scheduling DCI over-writes dynamic SFI; UE behavior on multiple slot/mini-slot transmission and reception which is configured semi-statically or semi-persistently or scheduled dynamically; and/or other.

In some embodiments, UE behavior on handling conflict between periodic transmission and DL/UL transmission from semi-static assignment may be based on one or more of the techniques, operations and/or concepts described below. As specified in NR, the UE 102 may not necessarily expect conflicting DL and UL direction from semi-static and dynamic slot configuration. However, for certain scenarios, this may not be always guaranteed by scheduling.

For instance, as defined in NR, the minimum periodicity for scheduling request (SR) transmission can be 2 symbols. If an SR with 2 symbol periodicity is configured for a given UE 102, it is possible that SR transmission may collide with other semi-statically configured DL/UL signals and channels (for instance, synchronization signal (SS) and physical broadcast channel (PBCH) or configured control resource sets (CORESET) for physical downlink control channel (PDCCH) transmission). Hence, UE behavior on handling conflict between periodic transmission and DL/UL transmission direction from semi-static assignment may be defined.

In some embodiments, in case of conflict between periodic transmission and DL/UL transmission from semi-static assignment, the UE 102 shall cancel the measurement or measurement related transmission. In a non-limiting example, the UE 102 shall not transmit any periodic or semi-statically configured UL transmission if one or more of symbols for the UL transmission overlaps with symbols that are not configured as DL or UL symbol via semi-static UL-DL configuration by either cell-specific or UE-specific RRC signaling, but correspond to symbols with SSBlock transmissions (synchronization signal and PBCH block) or correspond to symbols in which the UE 102 is configured to monitor for PDCCH. Such UL transmission may include UL transmissions with configured grants (or UL transmissions without UL grant), scheduling request (SR), periodic SRS, periodic CSI feedback, PRACH, and/or other.

In some embodiments, in case of conflict between periodic transmission and DL/UL transmission from semi-static assignment, the UE 102 may postpone the measurement or measurement related transmission. For instance, the UE 102 may wait for the next available opportunity (in occasions which are configured by higher layers) for measurement related transmission in order to avoid collision between measurement related transmission/reception and semi-static DL/UL assignment.

In some embodiments, UE behavior on handling of semi-statically/persistently configured Rx/Tx in a symbol in which dynamic scheduling DCI over-writes dynamic SFI may be based on one or more of the techniques, operations and/or concepts described below. As captured below in TS38.213 V15.0.0, in flexible symbols which are configured by semi-static DL/UL configuration, the UE 102 can only transmit or receive measurement related channels/signals when dynamic SFI indicates these symbols are UL or DL symbols, respectively.

For a set of symbols of a slot that are indicated as flexible by higher layer parameter UL-DL-configuration-common and, when provided, by higher layer parameter UL-DL-configuration-dedicated, one or more of the following may be applicable. In some embodiments, if a UE 102 is configured by higher layers reception of PDCCH or periodic/semi-persistent CSI-RS or SPS PDSCH in the set of symbols of the slot, the UE 102 shall receive PDCCH or periodic/semi-persistent CSI-RS or SPS PDSCH in the set of symbols of the slot only if the UE detects a DCI format 2_0 that indicates the set of symbols of the slot as downlink. In some embodiments, if a UE 102 is configured by higher layers transmission of trigger type 0 SRS, or PUCCH, or PUSCH without UL grant, or PRACH in the set of symbols of the slot, the UE 102 shall transmit trigger type 0 SRS, or PUCCH, or PUSCH without UL grant, or PRACH in the set of symbols of the slot only if the UE detects a DCI format 2_0 that indicates the set of symbols of the slot as uplink.

However, in cases in which dynamic SFI indicates these symbols are flexible symbols and UE specific data follows the same DL/UL direction as the measurement related transmission and reception (Tx/Rx), the UE 102 may follow the direction indicated by UE specific data and may continue to perform measurement related Tx/Rx. Hence, UE behavior on handling of semi-statically/persistently configured Rx/Tx in a symbol in which dynamic scheduling DCI over-writes dynamic SFI can be provided as follows. In some embodiments, for flexible symbols which are configured by semi-static DL/UL configuration, the UE 102 may be expected to perform measurement related Tx/Rx if dynamic scheduling DCI over-writes dynamic SFI and dynamic DCI indicates the same direction as measurement related Tx/Rx. In some embodiments, for a set of symbols of a slot that are indicated as flexible by higher layer parameter UL-DL-configuration-common and, when provided, by higher layer parameter UL-DL-configuration-dedicated, one or more of the following may be applicable. In some embodiments, if a UE 102 is configured by higher layers reception of PDCCH or periodic/semi-persistent CSI-RS or SPS PDSCH in the set of symbols of the slot, the UE 102 shall receive PDCCH or periodic/semi-persistent CSI-RS or SPS PDSCH in the set of symbols of the slot if the UE 102 detects a DCI format 2_0 that indicates the set of symbols of the slot as downlink or if the UE 102 detects a DCI format 1_0 or DCI format 1_1 indicating to the UE 102 to receive PDSCH or CSI-RS in the set of symbols of the slot. In some embodiments, if a UE 102 is configured by higher layers transmission of trigger type 0 SRS, or PUCCH, or PUSCH without UL grant, or PRACH in the set of symbols of the slot, the UE 102 shall transmit trigger type 0 SRS, or PUCCH, or PUSCH without UL grant, or PRACH in the set of symbols of the slot only if the UE 102 detects a DCI format 2_0 that indicates the set of symbols of the slot as uplink or if the UE 102 detects a DCI format with CRC scrambled by C-RNTI indicating to the UE 102 to transmit PUSCH, PUCCH, PRACH, or SRS in the set of symbols of the slot.

In some embodiments, UE behavior on multiple slot/mini-slot transmission and reception which is configured semi-statically or semi-persistently or scheduled dynamically may be based on one or more of the techniques, operations and/or concepts described below. In some embodiments, UE behavior may be defined for DCI granted multi-slot transmission (PDSCH/PUSCH/PUCCH) versus semi-static DL/UL assignment. In some embodiments, for DCI granted multi-slot transmission (PD SCH/PUSCH/PUCCH) vs semi-static DL/UL assignment, one or more of the following may be used: if semi-static DL/UL assignment configuration of a slot has no direction confliction with scheduled PDSCH/PUSCH/PUCCH assigned symbols, the PDSCH/PUSCH/PUCCH in that slot can be transmitted; if semi-static DL/UL assignment configuration of a slot has direction confliction with scheduled PDSCH/PUSCH/PUCCH assigned symbols, the PDSCH/PUSCH/PUCCH transmission in that slot is cancelled; and/or other. In some embodiments, for DCI granted multi-slot transmission (PDSCH/PUSCH/PUCCH) vs dynamic SFI, when there is no semi-static DL/UL assignment or the semi-static DL/UL assignment indicates unknown, the UE 102 may follow scheduled multi-slot transmission.

In some embodiments, UE behavior on handling multi-slot/mini-slot Tx/Rx which is configured semi-statically or semi-persistently or scheduled dynamically with semi-static DL/UL assignment may be based on one or more of the following techniques, operations and/or concepts. In some embodiments, for dynamically triggered multi-slot/mini-slot Tx/Rx, in cases in which the number of available DL or UL symbols in each slot or mini-slot is less than the duration which is indicated by downlink control information (DCI) with DL and UL grant, respectively, the UE 102 shall cancel the transmission of UL channels/signals or reception of DL channels/signals in the slot or mini-slot.

In some embodiments, in cases in which a number of available DL or UL symbols in each slot or mini-slot is greater than or equal to the duration which is indicated by DCI with DL and UL grant, respectively, the UE 102 shall continue transmission of UL channels/signals or reception of DL channels/signals in the slot or mini-slot.

In some embodiments, for dynamically triggered multi-slot/mini-slot Tx/Rx, in cases in which the number of available DL or UL symbols in each slot or mini-slot is less than the duration which is indicated by downlink control information (DCI) with DL and UL grant, respectively, the UE 102 shall postpone the transmission of UL channels/signals or reception of DL channels/signals in the slot or mini-slot. In some embodiments, for semi-statically or semi-persistently configured multi-slot/mini-slot Tx/Rx, including Type 1 and Type 2 grant free uplink transmission, DL or UL semi-persistent transmission, or configured scheduling uplink transmission, one or more of the following may be applicable: dynamic SFI may over-write some symbols of a multi-slot/multi-mini-slot transmission; some symbols may have different DL/UL direction which are indicated by semi-static DL/UL configuration; some symbols may be over-written by UE specific DCI; and/or other. In some embodiments, the UE 102 may drop or cancel the transmission of UL channels/signals or reception of DL channels/signals for all multi-slot/mini-slot Tx/Rx for that aggregated Tx/Rx. In some embodiments, in cases in which the number of available DL or UL symbols in each slot or mini-slot is less than the duration which is indicated by downlink control information (DCI) with DL and UL grant, respectively, the UE 102 shall cancel or postpone the transmission of UL channels/signals or reception of DL channels/signals in that slot or mini-slot.

In some embodiments, for semi-statically or semi-persistently configured or dynamically triggered multi-slot/mini-slot Tx/Rx, in cases in which inter-slot/mini-slot frequency hopping is enabled, in cases in which the UE 102 drops/cancels the transmission of UL channels/signals or reception of DL channels/signals in one slot, frequency hopping boundary may be determined taking into account the dropped slot/mini-slot.

In one option, in cases in which inter-slot frequency hopping occurs on per slot basis, if the UE 102 drops or cancels the transmission of UL channels/signals or reception of DL channels/signals in one slot, a frequency hopping pattern may follow the same pattern without dropping or cancellation of the transmission of UL channels/signals or reception of DL channels/signals in one slot. In FIG. 9, a non-limiting example 900 of a frequency hopping pattern for transmissions 905 is shown for this option.

In another option, in cases in which inter-slot frequency hopping occurs on per slot basis, if the UE 102 drops or cancels the transmission of UL channels/signals or reception of DL channels/signals in one slot, a frequency hopping pattern may restart after the slot which is dropped or cancelled. In FIG. 9, a non-limiting example 950 of a frequency hopping pattern for transmissions 955 is shown for this option.

The above options for frequency hopping pattern determination may be applicable in cases in which the UE 102 postpones the transmission/reception in case of semi-statically or semi-persistently configured or dynamically triggered multi-slot/mini-slot Tx/Rx, although the scope of embodiments is not limited in this respect.

The techniques, operations and/or methods described below and elsewhere herein may be applicable to fifth generation (5G) or new radio (NR) systems, although the scope of embodiments is not limited in this respect. In some embodiments, the UE 102 may determine whether transmission or reception of physical channels and signals is applicable in case of time-domain conflicts with determined link directions. In some embodiments, in case of conflict between periodic transmission and DL/UL transmission from semi-static assignment, the UE 102 shall cancel or postpone the measurement or measurement related transmission. In some embodiments, for flexible symbols which are configured by semi-static DL/UL configuration, the UE 102 may be expected to perform measurement related Tx/Rx if dynamic scheduling DCI over-writes dynamic SFI and dynamic DCI indicates the same direction as measurement related Tx/Rx. In some embodiments, for dynamically triggered multi-slot/mini-slot Tx/Rx, in cases in which the number of available DL or UL symbols in each slot or mini-slot is less than the duration which is indicated by downlink control information (DCI) with DL and UL grant, respectively, the UE 102 shall cancel the transmission of UL channels/signals or reception of DL channels/signals in the slot or mini-slot. In some embodiments, in cases in which the number of available DL or UL symbols in each slot or mini-slot is greater than or equal to the duration which is indicated by DCI with DL and UL grant, respectively, the UE 102 shall continue transmission of UL channels/signals or reception of DL channels/signals in the slot or mini-slot. In some embodiments, for dynamically triggered multi-slot/mini-slot Tx/Rx, in cases in which the number of available DL or UL symbols in each slot or mini-slot is less than the duration which is indicated by downlink control information (DCI) with DL and UL grant, respectively, the UE 102 shall postpone the transmission of UL channels/signals or reception of DL channels/signals in the slot or mini-slot.

In some embodiments, for semi-statically or semi-persistently configured multi-slot/mini-slot Tx/Rx, including Type 1 and Type 2 grant free uplink transmission, DL or UL semi-persistent transmission, or configured scheduling uplink transmission, in cases in which dynamic SFI may over-write some symbols of a multi-slot/multi-mini-slot transmission or some symbols may have different DL/UL direction which are indicated by semi-static DL/UL configuration or some symbols may be over-written by UE specific DCI, the UE 102 may drop or cancel the transmission of UL channels/signals or reception of DL channels/signals for all multi-slot/mini-slot Tx/Rx for that aggregated Tx/Rx.

In some embodiments, in cases in which the number of available DL or UL symbols in each slot or mini-slot is less than the duration which is indicated by downlink control information (DCI) with DL and UL grant, respectively, the UE 102 shall cancel or postpone the transmission of UL channels/signals or reception of DL channels/signals in that slot or mini-slot.

In some embodiments, in cases in which inter-slot frequency hopping occurs on per slot basis, if the UE 102 drops or cancels the transmission of UL channels/signals or reception of DL channels/signals in one slot, a frequency hopping pattern follows the same pattern without dropping or cancellation of the transmission of UL channels/signals or reception of DL channels/signals in one slot. In some embodiments, in cases in which inter-slot frequency hopping occurs on per slot basis, if the UE 102 drops or cancels the transmission of UL channels/signals or reception of DL channels/signals in one slot, the frequency hopping pattern restarts after the slot which is dropped or cancelled.

In Example 1, an apparatus of a User Equipment (UE) may comprise memory. The apparatus may further comprise processing circuitry. If the UE is configured by higher layers to transmit, in a set of symbols of a slot: a sounding reference signal (SRS), a physical uplink control channel (PUCCH), a physical uplink shared channel (PUSCH), or a physical random access channel (PRACH); and if a downlink control information (DCI) format comprising one of DCI format 1_0, and DCI format 1_1, and DCI format 0_1, is detected; and if the DCI format indicates that the UE is to receive, in a subset of the set of symbols of the slot, channel state information reference signals (CSI-RS) or a physical downlink shared channel (PDSCH): the processing circuitry may be configured to cancel transmission of the PUCCH, the PUSCH, or the PRACH in remaining symbols from the set of symbols; and cancel transmission of the SRS in remaining symbols from the subset of symbols.

In Example 2, the subject matter of Example 1, wherein if the UE is configured to receive a PDCCH or a PDSCH, or a CSI-RS in the set of symbols: the processing circuitry may be further configured to decode the PDCCH, the PDSCH or the CSI-RS if the UE does not detect a DCI format 0_0, DCI format 0_1, DCI format 1_0, DCI format 1_1, or DCI format 2_3 that indicates to the UE to transmit a PUSCH, a PUCCH, a PRACH, or a SRS in at least one symbol of the set of symbols of the slot.

In Example 3, the subject matter of one or any combination of Examples 1-2, wherein the processing circuitry may be further configured to, if the DCI format does not indicate that the UE is to receive the CSI-RS or the PDSCH in the symbols of the slot, or if the UE does not detect the DCI format: a) if the UE is configured to transmit the PUCCH, the PUSCH or the PRACH in the set of symbols of the slot, and if the transmission of the PUCCH, the PUSCH or the PRACH overlaps the remaining symbols from the set of symbols, continue transmission of the PUCCH, the PUSCH, or the PRACH in the remaining symbols from the set of symbols; and b) if the UE is configured to transmit the SRS in the set of symbols of the slot, and if the transmission of the SRS overlaps the remaining symbols from the subset of symbols, continue transmission of the SRS in the remaining symbols from the subset of symbols.

In Example 4, the subject matter of one or any combination of Examples 1-3, wherein the DCI format is a first DCI format. If a second DCI format of DCI format 2_0 with a slot format value other than 255 that indicates a slot format with a subset of symbols from the set of symbols as downlink or flexible, the processing circuitry may be further configured to: cancel transmission of the PUCCH, the PUSCH, or the PRACH in remaining symbols from the set of symbols; and cancel transmission of the SRS in remaining symbols from the subset of symbols.

In Example 5, the subject matter of one or any combination of Examples 1-4, wherein the slot format may be configurable to include uplink symbols, downlink symbols, and flexible symbols.

In Example 6, the subject matter of one or any combination of Examples 1-5, wherein the processing circuitry may be further configured to cancel the transmission of the PUCCH, the PUSCH, or the PRACH in the remaining symbols from the set of symbols if: the UE is configured to transmit the PUCCH, the PUSCH or the PRACH in the set of symbols, and the DCI format indicates that the UE is to receive, in the subset of the symbols of the slot, the CSI-RS or the PDSCH. The processing circuitry may be further configured to cancel the transmission of the SRS in the remaining symbols from the subset of symbols if: the UE is configured to transmit the SRS in the set of symbols, and the DCI format indicates that the UE is to receive, in the subset of the symbols of the slot, the CSI-RS or the PDSCH.

In Example 7, the subject matter of one or any combination of Examples 1-6, wherein the processing circuitry may be further configured to determine whether there is a conflict between: assignment of the set of symbols for downlink reception indicated by the DCI format, and assignment of the set of symbols for uplink transmission as configured by the higher layers. The processing circuitry may be further configured to, if it is determined that there is a conflict, refrain from uplink transmission in at least a portion of the set of symbols.

In Example 8, the subject matter of one or any combination of Examples 1-7, wherein the UE may be arranged to operate in accordance with a new radio (NR) protocol.

In Example 9, the subject matter of one or any combination of Examples 1-8, wherein the apparatus may include a transceiver to receive the DCI format. The processing circuitry may include a baseband processor to decode the DCI format. The memory may be configured to store at least a portion of the DCI format.

In Example 10, a non-transitory computer-readable storage medium may store instructions for execution by processing circuitry of a User Equipment (UE). If the UE is scheduled by a downlink control information (DCI) format 1_1 or a DCI format 1_0 to receive a physical downlink shared channel (PDSCH) over a plurality of slots; and if a TDD-UL-DL-ConfigurationCommon information element (IE) or a TDD-UL-DL-ConfigDedicated IE indicates that, for a slot from the plurality of slots, from a set of symbols in which the UE is scheduled to receive the PDSCH in the slot, at least one symbol of the set of symbols is an uplink symbol: the operations may configure the processing circuitry to refrain from reception of the PDSCH in the slot.

In Example 11, the subject matter of Example 10, wherein the DCI is a first DCI, the plurality of slots is a first plurality of slots, and the set of symbols is a first set of symbols. If the UE is scheduled by a second DCI of DCI format 0_1 or a DCI format 0_0 to transmit a physical uplink shared channel (PUSCH) over a second plurality of slots; and if the TDD-UL-DL-ConfigurationCommon IE or the TDD-UL-DL-ConfigDedicated IE indicate that, for a slot from the second plurality of slots, from a second set of symbols in which the UE is scheduled to transmit the PUSCH in the slot, at least one symbol of the second set of symbols is a downlink symbol: the operations may further configure the processing circuitry to refrain from transmission of the PUSCH in the slot.

In Example 12, the subject matter of one or any combination of Examples 10-11, wherein the operations may further configure the processing circuitry to determine whether there is a conflict between: assignment of the plurality of symbols for downlink reception of the PDSCH indicated by the DCI, and assignment of the plurality of symbols for uplink transmission. The operations may further configure the processing circuitry to, if it is determined that there is a conflict, refrain from downlink reception in at least a portion of the plurality of symbols.

In Example 13, the subject matter of one or any combination of Examples 10-12, wherein the operations may further configure the processing circuitry to decode a system information block type-1 (SIB1) that includes the TDD-UL-DL-ConfigurationCommon IE or the TDD-UL-DL-ConfigDedicated IE.

In Example 14, an apparatus of a User Equipment (UE) may comprise memory. The apparatus may further comprise processing circuitry. If, for a set of symbols of a slot that are indicated to the UE, by an ssb-PositionsInBurst element included in a System Information Block Type 1 (SIB1) or in a ServingCellConfigCommon information element (IE), for reception of synchronization signal/physical broadcast channel (SS/PBCH) blocks, if a transmission of a physical uplink shared channel (PUSCH), a physical uplink control channel (PUCCH) or a physical random access channel (PRACH) in the slot would overlap with at least one symbol from the set of symbols: the processing circuitry may be configured to refrain from transmission of the PUSCH, PUCCH or PRACH in the slot; and refrain from transmission of a sounding reference signal (SRS) in the set of symbols.

In Example 15, the subject matter of Example 14, wherein the processing circuitry may be further configured to decode a higher-layer configuration using Radio Resource Control (RRC) signaling or a downlink control information (DCI) format that configures the UE to transmit the SRS, the PUCCH, the PUSCH or the PRACH in the slot. The DCI format may be one of: DCI format 0_0, DCI format 0_1, DCI format 1_0, DCI format 1_1, and DCI format 2_3.

In Example 16, the subject matter of one or any combination of Examples 14-15, wherein the processing circuitry may be further configured to determine whether there is a conflict between: assignment of the set of symbols for downlink reception of the SS/PBCH indicated by the SIB1 or ServingCellConfigCommon IE, and assignment of the set of symbols for uplink transmission PUSCH, PUCCH or PRACH. The processing circuitry may be further configured to, if it is determined that there is a conflict, refrain from uplink transmission in at least a portion of the set of symbols.

In Example 17, the subject matter of one or any combination of Examples 14-16, wherein the processing circuitry may be further configured to, for flexible symbols configured by a semi-static downlink/uplink (DL/UL) configuration, perform a transmit/receive (Tx/Rx) measurement if: a dynamic scheduling downlink control information (DCI) over-writes a dynamic slot format indicator (SFI), and the dynamic scheduling DCI indicates a second direction that is the same as a first direction for the Tx/Rx measurement. Each of the first and second directions may be an uplink direction or a downlink direction.

In Example 18, the subject matter of one or any combination of Examples 14-17, wherein the processing circuitry may be further configured to, for a dynamically triggered multi-slot/mini-slot transmission/reception (Tx/Rx), when a number of available downlink (DL) or uplink (UL) symbols in each slot or mini-slot is less than a duration indicated by a downlink control information (DCI) of a DL grant or a UL grant: postpone transmission of one or more uplink elements, or postpone reception of one or more downlink elements.

In Example 19, the subject matter of one or any combination of Examples 14-18, wherein the processing circuitry may be further configured to, for semi-statically or semi-persistently configured or dynamically triggered multi-slot/mini-slot transmission/reception (Tx/Rx), when inter-slot/mini-slot frequency hopping is enabled, when the UE drops or cancels transmission of one or more uplink elements or cancels reception of one or more downlink elements of a slot: determine a frequency hopping boundary based at least partly on the slot.

In Example 20, the subject matter of one or any combination of Examples 14-19, wherein the processing circuitry may be further configured to, for frequency hopping on a per-slot basis, if the UE drops or cancels transmission of one or more uplink elements or cancels reception of one or more downlink elements in a slot: determine a frequency hopping pattern based on another frequency pattern that would occur without the UE dropping or canceling of the transmission or reception in the slot.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a User Equipment (UE) configured for operating in a Next-Generation Radio Access Network (NG-RAN), the apparatus comprising: memory; and processing circuitry coupled to the memory, wherein the processing circuitry is configured to:
    decode radio-resource control (RRC) signalling that includes a TDD-UL-DL-ConfigurationCommon information element (IE);
    set a slot format over a number of slots of based on the TDD-UL-DL-ConfigurationCommon IE, the slot format comprising downlink symbols, uplink symbols, and flexible symbols;
    detect a downlink control information (DCI) granted multi-slot reception of a physical downlink shared channel (PDSCH) comprising multiple slots;
    identify first slots of the multiple slots where the UE is scheduled for the PDSCH reception in which at least one symbol is indicated to be an uplink symbol based on the slot format; and
    receive the PDSCH in the multiple slots other than the identified first slots,
    wherein the memory is configured to store the slot format.

2. The apparatus of claim 1 wherein the processing circuitry is to configure the UE to refrain from receiving the PDSCH in the identified first slots.

3. The apparatus of claim 1, wherein the processing circuitry is further configured to:
    detect a DCI granted multi-slot transmission of a physical uplink shared channel (PUSCH) comprising multiple slots;
    identify second slots of the multiple slots where the UE is scheduled for the PUSCH transmission in which at least one symbol is indicated to be a downlink symbol based on the slot format; and
    encode the PUSCH for transmission in the multiple slots other than the identified second slots.

4. The apparatus of claim 3 wherein the processing circuitry is to configure the UE to refrain from transmitting the PUSCH in the identified second slots.

5. The apparatus of claim 1, wherein the flexible symbols are to be either uplink symbols or downlink symbols based on a dynamic slot-format indicator (SFI).

6. A non-transitory computer-readable storage medium that stores instructions for execution by processing circuitry of a User Equipment (UE) configured for operating in a Next-Generation Radio Access Network (NG-RAN), the processing circuitry configured to:
    decode radio-resource control (RRC) signalling that includes a TDD-UL-DL-ConfigurationCommon information element (IE);
    set a slot format over a number of slots of based on the TDD-UL-DL-ConfigurationCommon IE, the slot format comprising downlink symbols, uplink symbols, and flexible symbols;
    detect a downlink control information (DCI) granted multi-slot reception of a physical downlink shared channel (PDSCH) comprising multiple slots;
    identify first slots of the multiple slots where the UE is scheduled for the PDSCH reception in which at least one symbol is indicated to be an uplink symbol based on the slot format; and
    receive the PDSCH in the multiple slots other than the identified first slots.

7. The non-transitory computer-readable storage medium of claim 6 wherein the processing circuitry is to configure the UE to refrain from receiving the PDSCH in the identified first slots.

8. The non-transitory computer-readable storage medium of claim 6, wherein the processing circuitry is further configured to:
    detect a DCI granted multi-slot transmission of a physical uplink shared channel (PUSCH) comprising multiple slots;
    identify second slots of the multiple slots where the UE is scheduled for the PUSCH transmission in which at least one symbol is indicated to be a downlink symbol based on the slot format; and
    encode the PUSCH for transmission in the multiple slots other than the identified second slots.

9. The non-transitory computer-readable storage medium of claim 8 wherein the processing circuitry is to configure the UE to refrain from transmitting the PUSCH in the identified second slots.

10. A non-transitory computer-readable storage medium that stores instructions for execution by processing circuitry of a generation Node B (gNB) configured for operating in a Next-Generation Radio Access Network (NG-RAN), the processing circuitry configured to:
    encode radio-resource control (RRC) signalling that includes a TDD-UL-DL-ConfigurationCommon information element (IE) for transmission to a user equipment (UE) to configure the UE with a slot format over a number of slots, the slot format comprising downlink symbols, uplink symbols, and flexible symbols;
    encode a DCI granting a multi-slot transmission of a physical uplink shared channel (PUSCH) comprising multiple slots,
    decode the PUSCH received from the UE, the PUSCH received in the multiple slots other than second slots, wherein the second slots comprise slots of the multiple slots where the UE is scheduled for the PUSCH transmission in which at least one symbol is indicated to be a downlink symbol based on the slot format.

11. An apparatus of a generation Node B (gNB) configured for operating in a Next-Generation Radio Access Network (NG-RAN), the apparatus comprising: processing circuitry; and memory, wherein the processing circuitry is configured to:
    encode radio-resource control (RRC) signalling that includes a TDD-UL-DL-ConfigurationCommon information element (IE) for transmission to a user equipment (UE) to configure the UE with a slot format over a number of slots, the slot format comprising downlink symbols, uplink symbols, and flexible symbols;

encode a DCI granting a multi-slot transmission of a physical uplink shared channel (PUSCH) comprising multiple slots;

decode the PUSCH received from the UE, the PUSCH received in the multiple slots other than second slots, wherein the second slots comprise slots of the multiple slots where the UE is scheduled for the PUSCH transmission in which at least one symbol is indicated to be a downlink symbol based on the slot format; and store the TDD-UL-DL-ConfigurationCommon IE in the memory.

* * * * *